United States Patent [19]

Conner

[11] Patent Number: 5,197,768
[45] Date of Patent: Mar. 30, 1993

[54] RESTRAINED JOINT HAVING ELASTOMER-BACKED LOCKING SEGMENTS

[75] Inventor: Randall C. Conner, Warrior, Ala.

[73] Assignee: American Cast Iron Pipe Company, Birmingham, Ala.

[21] Appl. No.: 774,351

[22] Filed: Oct. 10, 1991

[51] Int. Cl.⁵ .............................................. F16L 21/02
[52] U.S. Cl. ................................... 285/105; 285/321; 285/231; 285/232; 285/374
[58] Field of Search ............... 285/374, 321, 104, 105, 285/231, 232; 277/DIG. 2

[56] References Cited

U.S. PATENT DOCUMENTS

| | | | |
|---|---|---|---|
| 3,843,167 | 10/1974 | Gronstedt | 285/105 |
| 3,884,510 | 5/1975 | Bram | 285/374 |
| 4,303,262 | 12/1981 | Pierrel et al. | 285/232 |
| 4,662,656 | 5/1987 | Douglas et al. | 285/321 |
| 5,037,144 | 8/1991 | Peting et al. | 285/321 |

FOREIGN PATENT DOCUMENTS

| | | | |
|---|---|---|---|
| 373920 | 6/1990 | European Pat. Off. | 285/321 |
| 2235391 | 1/1974 | Fed. Rep. of Germany | 285/231 |
| 2754984 | 6/1979 | Fed. Rep. of Germany | 285/105 |
| 3202367 | 10/1982 | Fed. Rep. of Germany | 285/374 |
| 3146379 | 6/1983 | Fed. Rep. of Germany | 285/321 |
| 1024537 | 3/1966 | United Kingdom | 285/105 |

Primary Examiner—Eric K. Nicholson
Attorney, Agent, or Firm—Kerkam, Stowell, Kondracki & Clarke

[57] ABSTRACT

A pipe joint and a locking member for use with the pipe joint are provided for a bell and spigot type joint, the locking member being a separate element disposed axially outwardly of a fluid seal gasket within the bell end of a first of the pipe elements, the locking member being made up of an elastomeric backing member and at least one locking segment, the elastomeric backing member being adapted to seat in a first annular recess in the bell end, and against a radially inwardly protruding shoulder, this seating position urging the outer surface of the locking segment into contact with the wall of the first annular recess, to effect a constant, positive wedging action against a spigot end of a second pipe element inserted into the bell end of the first pipe element. The locking member thus securely engages and retains the spigot end within the bell end against axial forces tending to separate the pipe elements, and the locking member serves as a dirt seal improving the prevention of dirt and other materials from entering the bell end of the joint which could adversely affect the integrity of the fluid seal or interfere with the ability to efficiently induce any desired joint deflection.

36 Claims, 4 Drawing Sheets

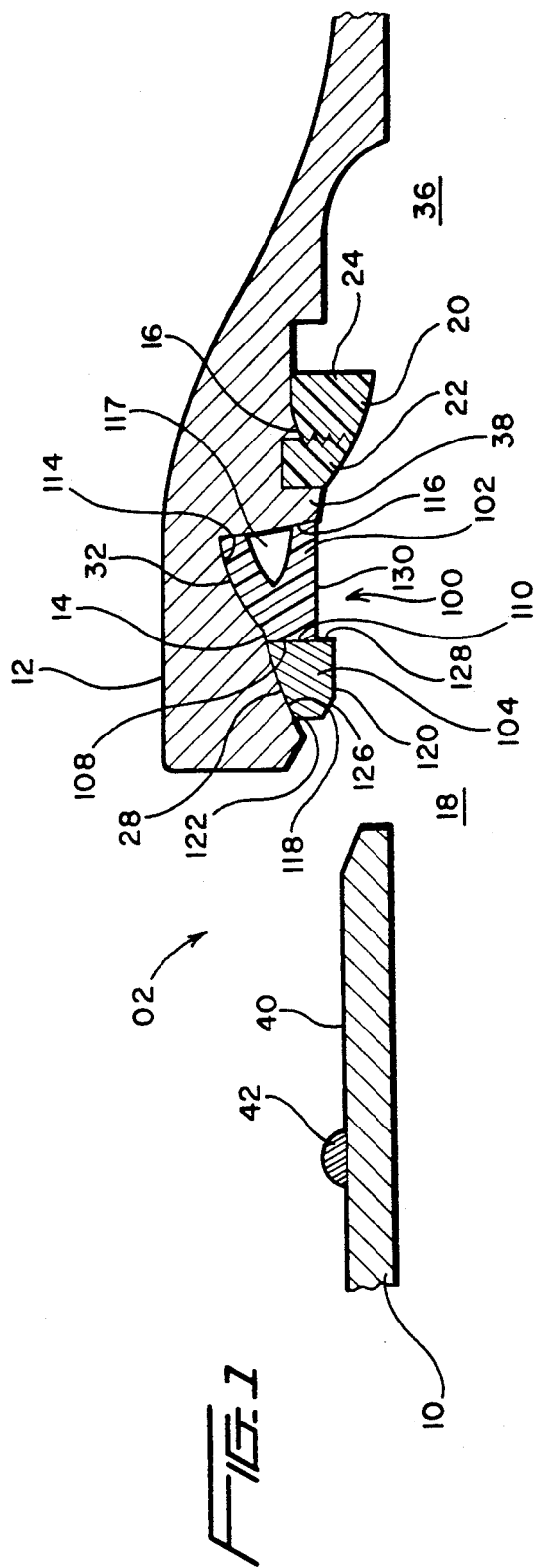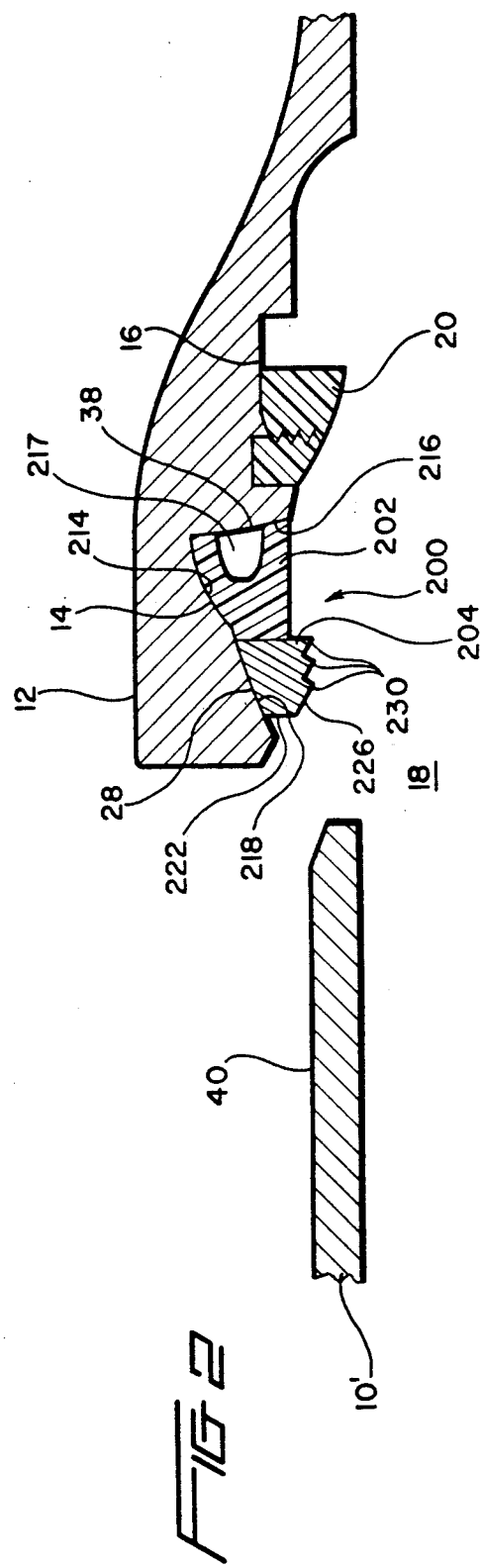

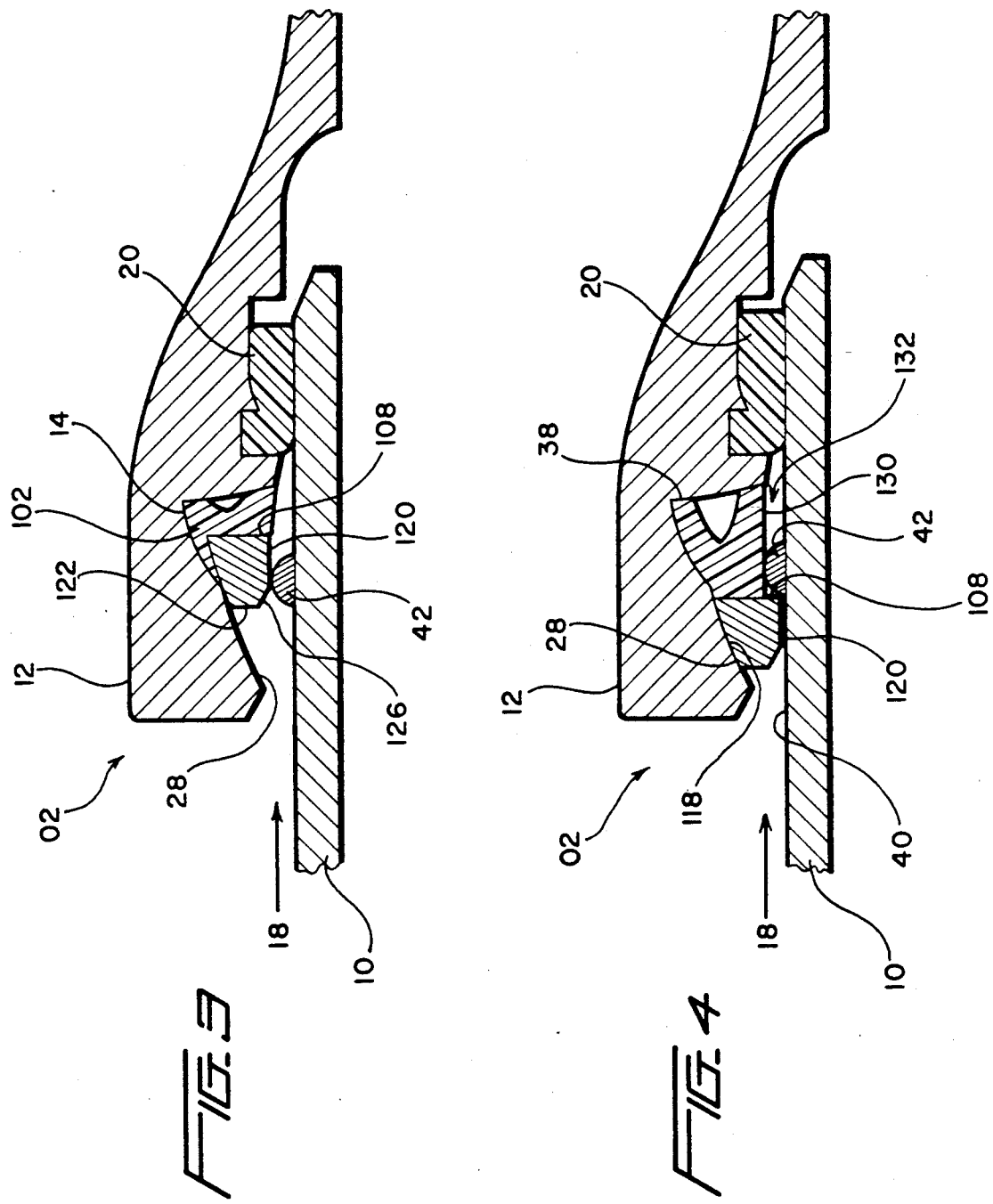

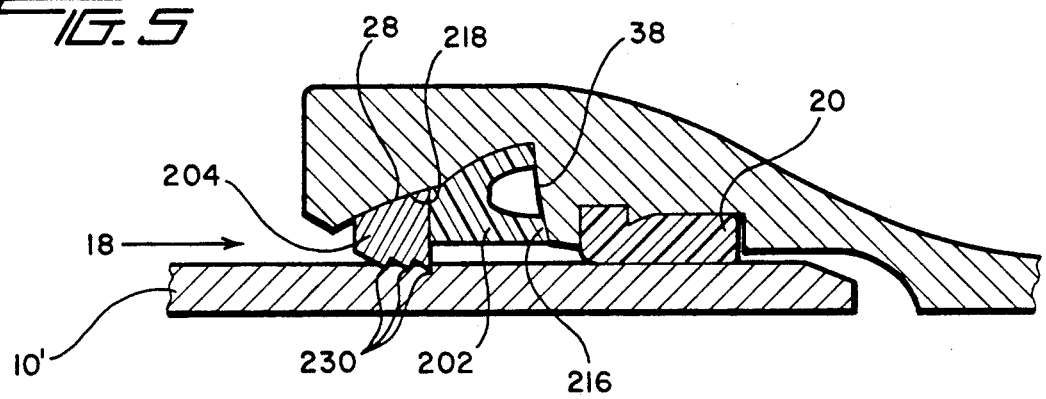
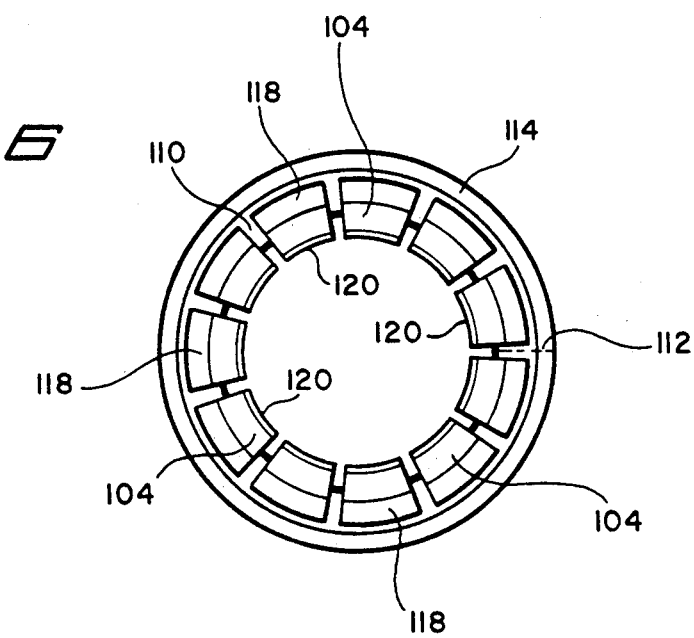
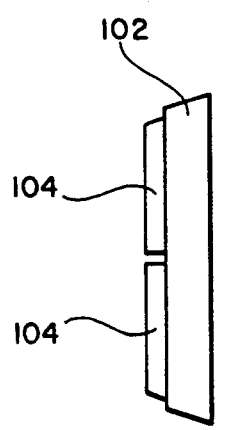
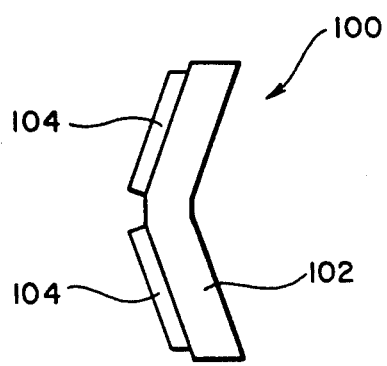

RESTRAINED JOINT HAVING ELASTOMER-BACKED LOCKING SEGMENTS

BACKGROUND OF THE INVENTION

1. Field of the Invention

The present invention relates to a flexible, restrained pipe joint employing locking segments having an elastomeric backing and a separate fluid seal gasket, which is particularly useful with large diameter ductile iron pipe.

2. Description of Related Art

Heretofore, numerous locking arrangements have been proposed for use in bell-and-spigot type joints to restrain axial movement of the spigot end of one pipe section relative to the bell end of another pipe section in which the spigot end is disposed. Two examples of ring-type locking structures are shown in prior U.S. Pat. No. 4,428,604, issued to Conner, and U.S. Pat. No. 4,685,708, issued to Conner and Walworth, both of which are assigned to the assignee of the present invention.

U.S. Pat. No. 4,805,932, to Imhof, discloses a pipe joint wherein the joint locking or restraining means is separate from the sealing ring, and the locking means comprises a gripping ring having a plurality of toothed gripping pieces embedded in and spaced around a circumference of a rubber ring. In addition, a collar is attached to the rubber ring which extends outwardly to the exterior of the bell end of the pipe section, the collar being used to hold the gripping ring in place, and to facilitate handling of the gripping ring. That patent recognizes and discusses certain limitations or drawbacks associated with joint configurations wherein the gripping ring and the sealing ring are formed as a single unit. For example, sudden axial pressure has the tendency to cause substantial withdrawal of the spigot from the socket, and can possibly permit complete withdrawal if the gripping teeth do not engage the spigot in a timely manner. The Imhof patent specifically refers to West German Patent No. 2,034,325, which has U.S. Pat. No. 3,724,880, issued to Seiler, as its equivalent U.S. patent. Imhof notes that the sealing and gripping rings in that patent leave a relatively large distance between the convex exterior surface of the gripping segments and the interior surface of the pipe socket. It is therein noted that the first time internal pressure is applied in the pipes, the gripping ring and sealing ring must move (with the spigot) a substantial axial distance before the gripping segments can be in a position to attempt to bite into the outer surface of the spigot to retain the spigot within the bell or socket.

A further potential limitation with respect to the single unit gripping/sealing ring not mentioned in that patent is that the degree of permissible deflection of the members joined may, in certain instances, be limited. The Imhof patent itself has the disadvantage that the connecting segment (numeral 24 in that patent), which is used to pull or urge the locking ring toward the open end of the bell, can be pinched between the bell and spigot when the joint is over-deflected, and can be torn by the pinching action. Once torn, the connecting segment loses its effectiveness in maintaining the locking ring in its desired position.

While prior joint designs for restrained joints may generally be regarded as being satisfactory in performance in many instances, the present invention provides improvements over those designs particularly in providing resiliently positive locking engagement of the locking members within the pipe bell, and in providing greatly increased contact area of the locking elements with the spigot end of the pipe around the circumference thereof, improving the restraining characteristics of the joint in general, including improving the potential for increased deflection angles, and improving the ability of the locking ring to prohibit dirt from entering into joint recesses, particularly during back fill.

Another important advantage of the present invention, when compared to the separate rubber-metal locking ring of the Imhof '932 patent, is that the relatively less complicated shape of the present invention can be more simply and economically mold-bonded by virtue of its geometry in a conventional, two-piece rubber-forming mold. The more complicated shape of the Imhof '932 structure requires more complicated molds consisting of more than two working parts and/or more cumbersome molding procedures, by virtue of its rubber/metal geometry.

It is a principal object of the present invention to provide a restrained joint for a bell-and-spigot type joint having a fluid sealing member or gasket and separate elastomer-backed locking segments which provide improved retention forces on the spigot within the bell, and which provide the ability to achieve increased amounts of deflection between the piping elements joined.

It is an additional object of the present invention to provide a locking member for a restrained joint which may be modified for use with pipe sections having various sized diameters.

It is another principal object of the present invention to provide a restrained joint for bell-and-spigot type piping elements having elastomer-backed locking segments and a separate fluid sealing member wherein the locking segments and backing member or members assist in serving as an effective dirt seal to significantly reduce the amount of dirt and other materials from gaining access to interior joint regions such as the region where the fluid sealing member is disposed.

It is another important object of the present invention to provide a locking means which is separate from the fluid seal means wherein the locking means is of a geometry enabling the use of a more simple and economical molding process for forming an elastomeric backing ring having locking segments bonded thereto.

It is a further important object of the present invention to provide the above-stated advantages in a push-on type restrained joint.

SUMMARY OF THE INVENTION

These and other objects of the present invention are realized in the restrained joint of the present invention by providing a plurality of arcuate locking segments made of ductile iron or steel which are secured to one or more elastomeric backing members, with the locking segments being disposed nearly completely around the entire 360° circumference of the joint. The elastomer-backed locking segments are adapted to be disposed in the bell end of a piping element in a first annular recess formed therein adjacent the open end of the bell. The first annular recess increases in diameter along an axial direction extending into the bell end of the piping element, and the outer radial surface formed by the locking segments and backing member or members are of approximately the same geometry as the annular recess. A separate fluid seal member of substantially conventional design is provided to seat in a second annular recess in the bell end of the piping element located inwardly of the first annular recess.

The locking segments may each be provided with one or more gripping teeth which will be presented to the spigot and will bite into the outer surface of the spigot to retain the spigot within the bell as the locking segments wedge between the tapered inner surface of the annular recess and the outer surface of the spigot. Alternatively, the locking segments can each be designed to provide an interlock surface to engage a circumferential weld bead formed on the outer surface of the spigot. In either embodiment, both the locking function of the locking members and the fluid sealing function of the sealing ring are attained in a joint which is assembled in a push-on manner, wherein the joint is assembled by placing the sealing ring in its associated recess in the bell end of a piping element, and the locking segments are introduced into the first annular recess either prior to insertion of the spigot, when the elastomeric backing is in the form of an integral ring, or after the insertion of the spigot in an embodiment wherein the locking segments have discrete arcuate elastomeric backing members.

The configurations of the first annular recess and the elastomeric backing of the locking members are such that the backing resiliently forces the locking segments into intimate and positive locking contact with the spigot and ensures that all of the locking segments contact the bell and spigot members around the entire joint. The locking segments thus securely restrain spigot ends within bell or socket ends even in the very large sizes of pipe to be joined. The complete or nearly complete circumferential engagement of the spigot by the locking segments maximizes the joint strength and minimizes stress concentrations in the members under load.

Further, the locking members, particularly when formed as an integral ring, provide a very effective dirt seal in that, not only do the locking segments present a substantially complete barrier in the circumferential gap between the bell and spigot ends of the joined members, but the elastomeric backing ring also very tightly engages the inner surface of the first annular recess of the bell around substantially the entire circumference of the joint. This dirt seal is effective at preventing dirt from entering joint recesses, even during and after backfill. This assures that the joint members will be able to deflect and transfer loads properly and efficiently.

An additional advantage is that the locking members of the present invention are configured such that an existing type of bell end internal pipe configuration, namely that shown in U.S. Pat. No. 4,685,708, can be used in the joint of the present invention.

BRIEF DESCRIPTION OF THE DRAWINGS

These and other features of the present invention and the attendant advantages will be readily apparent to those having ordinary skill in the art, and the invention will be more easily understood from the following detailed description of the preferred embodiments of the present invention taken in conjunction with the accompanying drawings wherein the like reference characters represent like parts throughout the several views.

FIG. 1 is a sectional view of a bell and spigot joint of the present invention prior to joint assembly, employing a first preferred embodiment of a locking ring.

FIG. 2 is a sectional view of a bell and spigot joint of the present invention prior to joint assembly, employing a second preferred embodiment of a locking ring.

FIG. 3 is a sectional view of the FIG. 1 joint depicting the joint as partially assembled.

FIG. 4 is a sectional view of the FIG. 1 joint after assembly.

FIG. 5 is a sectional view of the FIG. 2 joint after assembly.

FIG. 6 is an elevation view of the locking ring depicted in the FIG. 1 embodiment.

FIGS. 7A, 7B are side elevation views of the locking ring of the present invention.

DETAILED DESCRIPTION OF THE PREFERRED EMBODIMENTS

Figure 8:
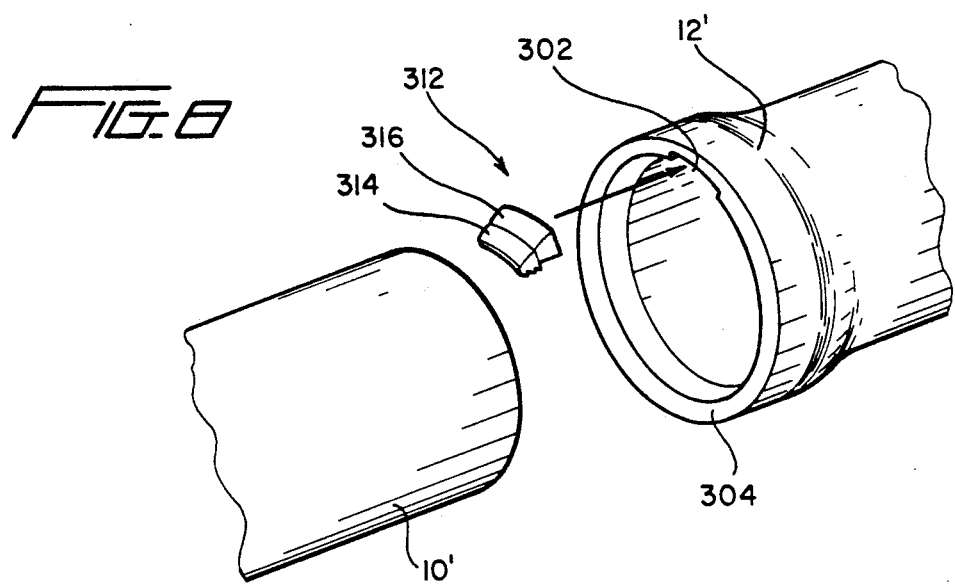
FIG. 8 is a perspective view of an alternative preferred embodiment of the present invention.

Referring initially to FIG. 1, there is illustrated a first embodiment of the components which will make up a self-locking axially restrained pipe joint 02 in accordance with the present invention. FIG. 1 shows the spigot end 10 of a first pipe and a bell or socket end 12 of a second pipe. It is to be noted that, while the specification discusses a joint between two sections of pipe, the invention is not intended to be so limited. Piping appurtenances such as valves, fittings, hydrants, and non-piping elements may be employed as one or both of the elements to be joined, and the terms "pipe" and "piping element" are used herein as generic terms which are intended to refer to these elements as well.

Bell end 12 is fabricated with two annular recess portions, a first annular recess 14 being disposed closest to the mouth or opening 18 at the end of the bell, and a second annular recess 16 disposed axially inwardly of the first annular recess. The second annular recess 16 is provided to retain a conventional sealing ring or gasket 20, which can preferably be of the type first disclosed in U.S. Pat. No. 2,991,092 to McKay, issued July 4, 1961, which patent is expressly incorporated herein by reference. This sealing ring 20 provides the fluid seal for the joint, and is not, by itself, generally able to retain the spigot end 10 within bell end 12 at high levels of forces tending to separate the members.

First annular recess 14 is provided in the bell 12, adjacent the mouth or open end 18 thereof, to provide a seating surface and a volume of space to accommodate therein a locking means or member, which in this preferred embodiment is a locking ring 100, which is designed to restrain or lock the spigot end 10 within the bell end 12 at the joint 02 when the joint members experience forces tending to separate the members. At least a portion of the first annular recess 14 is preferably larger in diameter than the second annular recess. The preferred configuration of the first annular recess is shown in FIG. 1 as having a two-part tapered circumferential wall, with a front part 28 of recess 14 (nearest the mouth of the bell) having a slightly arcuate tapered wall, and with a rear part 32 of recess 14 (axially inward of the front part) also having a slightly arcuate tapered wall of a larger circumference than the front part. Both the front 28 and rear 32 parts taper radially inwardly in a direction extending axially from the pipe interior 36 to the open end 18 of the bell.

An annular protrusion 38 in the bell interior serves to separate the first and second annular recesses, and preferably serves as a backing shoulder or abutting surface for the locking ring 100 or other locking means, the construction of which will be discussed later in the specification, and as a forward boundary or abutting surface for sealing ring 20. This bell end design is substantially identical to the bell end depicted in U.S. Pat. No. 4,688,708, issued to Conner, the inventor of the present invention, and Walworth, and assigned to the assignee of the present invention, and this bell end design is presently available in pipe manufactured by the assignee of the present invention.

The spigot 10 to be used in the FIG. 1 joint construction has a substantially cylindrical outer surface 40 somewhat smaller in diameter than the size of the mouth 18, and has a circumferential weldment or weld bead 42 extending around the outer surface at a predetermined distance from the opening at the end of the spigot. This predetermined distance will be selected based on the configuration of the bell end 12 and position of the locking ring 100 therein, as will be discussed in the ensuing paragraphs.

Locking ring 100 in the FIG. 1 embodiment comprises an annular elastomeric, preferably rubber, backing ring 102 and a plurality (see FIG. 6) of arcuate locking segments 104, which preferably are disposed substantially completely around the 360° circumference of the locking ring, as can be seen in FIG. 6 as well. The locking segments 104 are normally secured to the backing ring 102 in a manner such that they will remain in intimate engagement with the backing ring while in any expected service, as by bonding, bolting, gluing or other suitable securing means. One preferred approach is to directly bond the segments to the elastomer with a two part epoxy applied prior to the vulcanization of the rubber ring, with the epoxy curing during the vulcanization process. Preferably, a rear face 108 of each locking segment is secured to a front face 110 of the backing ring 102, such that, when the locking ring assembly is disposed in the first annular recess of the bell 12, the locking segments will be disposed axially forward (toward mouth 18) of the backing ring.

The circumferential or radial outer surface 114 of the backing ring preferably is tapered at approximately the same degree of taper as is present on the arcuate wall of the rear part 32 of first annular recess 14, and is preferably of a diameter substantially equal to or slightly greater than that of the arcuate wall, thereby ensuring a tight fit with that wall and thus ensuring firm support for the backing member and the segments attached thereto when seated in the recess 14.

This tight fit between the backing ring 102 and the rear part 32 of first annular recess exerts an evenly distributed, residual circumferential compressive force on the backing ring 102. It is this residual circumferential compressive force which permits the backing ring to retain its annular shape and remain seated in the annular recess. Without the residual circumferential compressive force, the elastomeric ring would not generally have sufficient structural strength or rigidity to retain its annular shape when disposed in an orientation other than horizontal, due to the weight of the locking segments. As such, the residual circumferential compressive force is required to radially support the weight of the locking segments in order to ensure that backing ring 102 will remain seated in first annular recess, and to retain the locking segments 104 in intimate contact with the wall of the front part of the first annular recess, prior to the insertion of a spigot.

Looking now at both FIGS. 1 and 6, the backing ring 102 may preferably be formed in a continuous solid annular shape, or may alternatively be split at one or more locations around the circumference thereof, as shown by dotted line 112 in FIG. 6. Providing one or more splits in the backing ring will facilitate the insertion of the locking ring 100 into the bell end 12 and seating of the locking ring in the first annular recess 14.

Further, a split elastomeric backing ring has the advantage that it would be possible to provide a single size locking ring or a small number of sizes of locking rings which could be used in joining pipe sections or pipe elements having varying diameters. For example, a split locking ring 100 of a suitable initial circumference for seating in a bell of a 30-inch pipe section could be employed in a 24-inch joint as well, by cutting off an appropriate length of the backing ring 102 such that the remaining circumferential length of the ring will permit a tight seating of the ring in the recess in a bell end of a 24-inch piping element. The radius of curvature of the spigot of a 24-inch pipe section is close enough to the radius of curvature of the 30-inch spigot that the arcuate locking segments 104 will securely engage either spigot in its respective joint. Alternatively, two or more smaller locking rings having splits therein could be cut to appropriate lengths and used in a single, large diameter pipe joint.

As with the backing rings having a continuous annular configuration, the split backing ring should be sized such that the ring will tightly fit into the first annular recess and will have a residual circumferential compressive force exerted thereon. This residual compressive force will provide the necessary support for the weight of the locking segments attached thereto.

It would be possible to produce locking rings in either a single initial size or in only a limited number of initial sizes, which could be used with a complete range of pipe sizes. This advantageous feature of the locking ring of the present invention comes as a result of employing a locking ring which is a completely separate element from the fluid seal means of the joint, in that, in an integral locking/sealing ring, providing the necessary split in the elastomeric ring in order to vary the size of the backing ring would at the same time provide a leak path or potential leak path through the fluid seal means.

As can be seen in FIG. 1, the backing ring 102 is also preferably of sufficient axial length such that the rear face 116 of the backing ring 102 will also abut shoulder 38 when the locking ring is seated in the recess 14, thereby being adapted to retain the locking segments at a desired axial position such that the outer radial surfaces 118 of the locking segments are always in intimate contact with the wall at the front part 28 of first annular recess 14.

The locking segments 104 used in the FIG. 1 embodiment are constructed to be used in a pipe joint when the spigot 10 to be retained in the bell 12 has the aforenoted weld bead 42 extending around the outer circumference thereof. The outer radial surface 118 of each locking segment 104 has a tapered surface which substantially corresponds to the angle of taper and shape of the arcuate wall in the front part 28 of first annular recess 14. The inner radial surface 120 of each locking segment is of a preferably substantially constant diameter over the majority of its axial extent or cross-sectional width, which, together with the outer radial surface 118, gives the locking segments a wedge-like cross-sectional configuration having an increasing cross-sectional thickness from a front end 122 of the segment to the rear end 108 of the segment which is secured to the elastomeric backing ring 102. The extreme front section of the locking segments 104 may preferably be tapered or beveled, as at 126, to converge toward outer radial surface 118 of the segment.

With the locking ring 100 comprising the elastomeric backing ring 102 and locking segments 104 thus configured in accordance with the FIG. 1 embodiment, the assembly of a joint 02 employing this locking ring 100 will now be discussed by referring to all of FIGS. 1, 3, 4 and 6. FIG. 1 shows the bell end 12 with the sealing ring 20 and the locking ring 100 already positioned therein. This assembly step is accomplished by relatively conventional procedures. Sealing ring 20, which may be made of a single material having a uniform degree of hardness, or may be made of a harder (higher durometer) front end 22, and a softer (lower durometer) rear end 24, can be readily elastically deformed into an effective diameter smaller than the dimension of the opening in the bell end by creating a fold in the ring, as is well known in the art. The folded ring 20 is inserted into the inner portion of the bell end 12 at the axial position of the second annular recess 16, and is released and allowed to return to its original ring shape, whereupon the sealing ring 20 becomes seated in the second annular recess 16.

Locking ring 100 is then inserted into bell end 12 to be seated in first annular recess 14. This ring, because it is larger in diameter than mouth 18 of the bell end, must also be deformed in some manner to pass therethrough. When the backing ring is split, as at 112 (FIG. 6), the adjacent ends of the ring created at the split may simply be overlapped by a sufficient amount to reduce the effective diameter of the ring to a size smaller than the mouth or opening 18. In an embodiment where backing ring 102 is completely contiguous, it will still be possible to insert the locking ring 100 by taking advantage of the elasticity of the backing ring. It may be possible to fold the locking ring in the well-known manner, as would be the case with the FIG. 6 embodiment, however, the iron or steel locking segments 104 secured to the backing ring 102 might, in some instances, restrict the ability to deform locking ring 100, particularly in embodiments where the segments collectively form a substantially complete annular locking means. In such embodiments, as shown, for example, in FIGS. 7A and 7B, the ring 100 may be inserted by bending the elastomeric backing ring back on itself to a sufficient extent to allow the locking ring 100 to pass through mouth 18. The elasticity of backing ring 102, will allow the ring 100 to return to its desired annular shape, thereby seating the ring 100 in the first annular recess 14 with the desired residual circumferential compressive forces acting on the backing ring. The bell end 12 of the pipe thus configured is shown in FIG. 1, and is now ready to receive a spigot end 10 therein.

Referring now to FIG. 1 and FIG. 3, the joint is assembled by aligning spigot end 10 with bell end 12 such that the longitudinal axes of the piping elements are substantially coaxial, and by moving spigot end 10 toward bell end 12 along this axis. FIG. 3 depicts the joint at a position wherein spigot end 10 has been partially inserted into bell end 12, and specifically to a point at which weld bead 42 has engaged and moved axially past the inner taper or bevel 126 at the front end 122 of the locking segments 104. The interaction of the weld bead with the inner taper on the locking segments, as axial assembly forces are applied, causes the locking segments to move axially inwardly and radially outwardly, compressing elastomeric backing ring 102 in the rear part of first annular recess 14.

Upon further insertion of the spigot end 10, weld bead 42 slides axially past the inner radial surface 120 of each of the locking segments 104 when the locking segments are displaced in the manner shown in FIG. 3. When the weld bead 42 has moved completely past the rear end 108 of locking segments 104, the compressed backing material will rebound (elastically recover), forcing locking segments 104 axially forward toward mouth 18, and radially inwardly as guided by the contact between the wall in the front part 28 of first annular recess 14 and the outer radial surface 118 of the segments.

As can be seen in FIG. 4, the locking ring 102 is sized to abut against annular shoulder 38 at a back end of first annular recess 114 and to extend axially away from the shoulder for a distance sufficient to urge the locking segments axially forward into positive contact with the wall of the front part of the annular recess. The locking segments are thus also urged into engagement with the outer surface 40 of spigot 10, with the weld bead 42 being captively retained behind the rear locking faces 108 of the locking segment 104, which is formed substantially perpendicularly to the inner radial surface 120 of the locking segment in the depicted preferred embodiment.

As best seen in the assembled joint of FIG. 4, in a preferred embodiment, the inner radial surfaces 120 of the locking rings 104 may form an opening of a smaller diameter than does the inner radial surface 130 of the elastomeric backing ring 102. Such a configuration provides clearance space 132 in which weld bead 42 will be disposed upon completion of the joint assembly. The inner radial surfaces of the backing ring 102 and the locking segments may also be more closely matched in diameter, however, it is preferred that the backing ring 102 not protrude radially inwardly past annular shoulder 38, so as to avoid any potential problem of pinching the backing ring between the annular shoulder and the spigot inserted into the bell.

It can be seen also in FIG. 4 that axial forces tending to separate the spigot end 10 and the bell end 12 of the respective piping elements will cause the weld bead 42 to engage the looking faces 108 of locking segments 104, further urging the locking segments toward mouth 18. Weld bead 42 will not be capable of moving the segments 104 radially outwardly to permit the weld bead to move axially past the locking segments 104 due to the wedging effect of the tapered outer surfaces of the locking segments 104 and the corresponding tapered wall 28 in the front part of first annular recess 14. The spigot end 10 is thus securely retained within bell end 12 and the joint will be able to withstand the considerable axial thrust loads which pipe sections experience in service.

FIGS. 2 and 5 depict an alternative preferred embodiment for use in the push-on self-restrained joint of the present invention. This embodiment provides an locking ring 200 of a somewhat different design, which is adapted to be used to retain and restrain a spigot end 10' of a piping element having no weld bead thereon. This type of joint is commonly referred to as being fieldadaptable, in that the spigot end of each section of pipe may be cut in the field to its desired length as the piping system is installed. There is no requirement, once the spigot end is cut, to form the circumferential weld bead on the outer surface of the spigot at the required distance from the cut end.

The spigot end 10' in this embodiment, as noted previously, omits the circumferential weld bead, but is preferably substantially identical to spigot end 10 (FIG. 1) in all other aspects. The bell end 12 and sealing ring 20 are also preferably substantially identical to those of the previously described preferred embodiment and the foregoing description of the features of the bell end 12 is to be used in understanding the configuration and construction of the joint of FIGS. 2 and 5. The locking ring 200 is of a different design, and operates on somewhat different principles in providing the means for retaining the spigot end within the bell end after joint assembly.

The elastomeric backing ring 202 is preferably sized in the same manner as backing ring 102, wherein the outer surface of the backing ring 214 will seat tightly in the rear part 32 of first annular recess 14, and the rear face 216 of backing ring 204 will abuttingly engage the shoulder 38 separating first annular recess 14 from second annular recess 16. This provides the residual circumferential compressive force on the ring 214 and the proper axial positioning of the locking segments 204.

In both the FIG. 1 and FIG. 2 preferred embodiments the backing members 102, 202 preferably have an annular notch 117, 217 extending around the rear face 116, 216 of the ring. This has been found to reduce the amount of force required to push the spigot into position during joint assembly, by providing a volume into which the elastomeric material may be compressed, and by reducing the amount of material to be compressed. In addition, the notch permits the inner portion of the ring to move more freely in a radial outward direction when a pipe spigot comes into contact with the ring.

Each locking segment 204 in this alternative embodiment has one or more teeth 230 disposed at the inner radial surface of the segment which are presented to the spigot end 10 of the pipe section to be inserted. The teeth 230 should be of a material which is harder than the spigot material so that the teeth will be able to bite into the outer circumferential surface 40 of the spigot in order to retain the spigot 10' within the bell end 12.

The pipe sections to be joined will most commonly be made of cast ductile iron, and the locking segments can therefore preferably be made of austempered ductile iron, oil-quenched and tempered ductile iron, or may be made of cast ductile iron provided with hardened stainless steel inserts for the teeth, in order to obtain teeth which will be harder than the spigot material. The entire locking segment could alternatively be made of a steel, such as the hardened stainless steel noted above, which is harder than cast ductile iron, however, using steel locking segments would increase the materials cost of the locking ring to some extent.

In many other respects, the constructional details of the locking ring 200 are the same as those of locking ring 100. The locking segments 204 have an outer radial surface 218 substantially conforming to the shape of the wall at the front part 28 of the first annular recess 14, as in the previous embodiment. The locking segments will preferably be bonded to the elastomeric backing ring in the manner of the examples previously noted. The front end 222 of the locking segments will have a taper or bevel 226 adapted to interact with the spigot upon the insertion of the spigot to move the locking segments axially inwardly and radially outwardly to accommodate the spigot. The taper 226 may be at a shallower angle than taper 126, and will preferably form the front side of the first tooth.

Assembly of the joint 04 in the embodiment of FIGS. 2 and 5 is similar to that previously described with respect to FIGS. 1, 3 and 4, in the sense that both are of the push-on joint type. The fluid sealing ring 20 and the locking ring 200 are seated in their respective annular recesses in the bell end 12 in the same manner as previously described. Spigot 10' is then inserted through opening 18, and engages the tapers or bevels 226 of the locking segments 200, which, as in the FIG. 6 embodiment, preferably collectively form a nearly 360° ring. The movement of the spigot 10' toward the interior 36 of the pipe urges the locking segments radially outwardly and axially inwardly, and the locking segments will be displaced in this manner as the elastomeric backing ring 202 is compressed in the first annular recess.

When the insertion of the spigot 10' is completed (FIG. 5), the tendency of the elastomeric backing ring to rebound (elastically recover) to its original shape has the effect of urging the locking segments axially forward toward the open end 18 of the bell into positive contact with the wall of the first annular recess, and thus also radially inwardly. The residual force imparted on the segments by the backing ring, coupled with the interaction of outer radial surface 218 with the wall 28 of the annular recess, provides a wedging effect which causes the teeth of the locking segments to be positioned to initiate a penetration or biting action of the teeth into the outer surface 40 of the spigot, and upon experiencing a subsequent application of joint separating thrust, the teeth will be urged to bite further into the outer surface of the spigot. As such, the locking ring provides a very secure means for retaining the spigot end of a piping element within the bell end of another piping element.

As can be seen in FIG. 5, after joint assembly, the elastomeric backing ring 202 preferably securely engages the wall of the first annular recess and is further tightly seated against the annular shoulder 38. This sealing engagement around the entire circumference, in conjunction with the near 360 ring of locking segments disposed at the forward end of the joint, provide an improved dirt seal, which effectively prevents dirt from reaching the fluid seal and joint deflection recesses.

Figure 10:
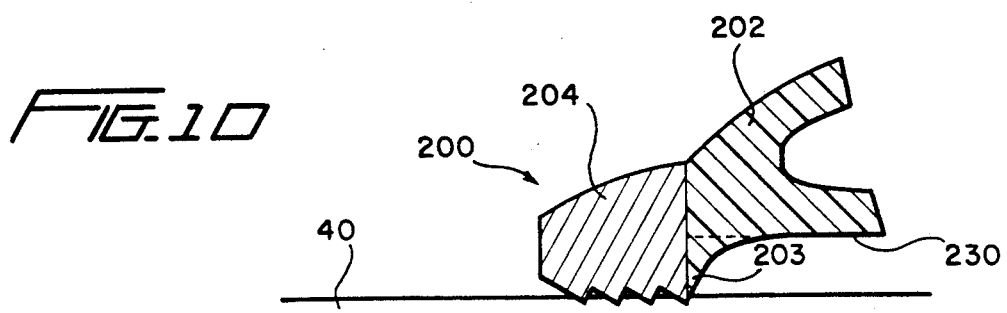
FIG. 10 is an elevation view of a section of an alternative embodiment of the locking ring.

As can be seen in an alternative preferred embodiment of the locking ring 200, in the tonding/vulcanization process, a thin rubber flap 203 may also be formed around the circumference of the elastomeric backing ring 202, the flap extending radially inwardly from the inner radial surface 231 of the backing ring to substantially the inner radial extent of locking segments 204. The flap 203 may also extend in the spaces between the locking segments 204. This rubber flap may assist in preventing dirt and other foreign matter from entering areas of the joint recesses which are preferably maintained free of foreign matter so that joint deflection will not be obstructed. The flap 203 shown in FIG. 10 may also be provided on a locking ring having locking segments designed to engage a weld bead on a spigot, such as the locking ring and segments shown in FIG. 1.

Figure 9:
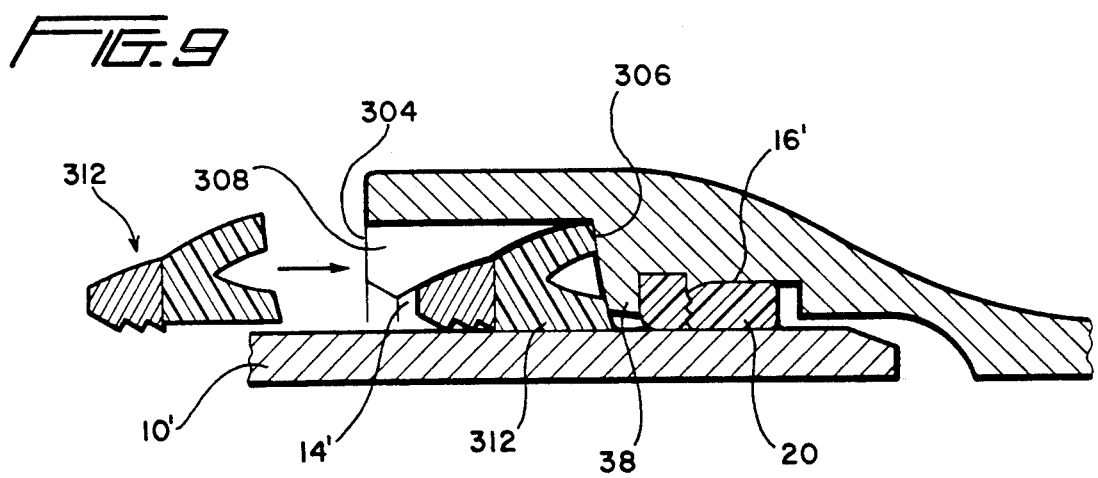
FIG. 9 is a sectional view of the joint of FIG. 8.

Referring now to FIGS. 8 and 9, a further alternative preferred embodiment of the present invention is depicted. In this embodiment, the socket 12' at the bell end of the pipe has substantially the same configuration as in the previous embodiments, with one exception. In the preferred embodiment of FIGS. 8 and 9, one or more slots 302 (one shown) are included at the outer shoulder 304 of the bell end 12'. The slot 302 extends to the back 306 of first annular recess 14', and provides a clearance space between the inner surface 308 of the bell 12' and the outer surface of the spigot 10'.

This bell end configuration is adapted to be used with an alternative embodiment of the locking means in the joint. In the embodiments of FIGS. 1 and 2, the locking means included a substantially continuous elastomeric backing ring having disposed thereon the plurality of locking segments. In contrast, the locking means of this preferred embodiment comprises a plurality of discrete locking member 312, each of the locking members 312 comprising an arcuate locking segment 314 with an associated arcuate elastomeric backing member 316.

As can be seen in the cross-sectional view of FIG. 9, the locking members 312 have substantially the same cross-sectional shape as locking ring 200. The locking members 312, as will be readily apparent, could also have a cross-section substantially identical to locking ring 100 when it is desired to restrain pipe having the circumferential weld bead (FIG. 1).

Because the discrete locking members 312 would not readily remain seated in first annular recess 14' prior to the insertion of the spigot in accordance with the joint assembly technique discussed with respect to the joints of FIGS. 1 and 2, the joint assembly procedure in this embodiment is altered, thus requiring the presence of slot 302. In assembling this joint embodiment, the sealing ring or gasket 20 is seated in second annular recess 16' (inner bell details not shown in FIG. 8), as with the previously described preferred embodiments. The spigot 10' is then inserted, without having the discrete locking members 312 in place within the first annular recess 14'.

Upon complete insertion of spigot 10' into bell 12', it can be seen that the outer shoulder 304 of bell end 12' would prevent the positioning of locking members 312 in the first annular recess 14'. The slot 302, however, is sized to provide sufficient clearance (see FIG. 9) for the locking members 312 to be inserted into the bell 12' completely to the annular protrusion or shoulder 38. The plurality of elastomer-backed locking members 312 can thus be pushed into the slot 302 and subsequently be forced in either direction around the circumference of the spigot 10' into the portion of first annular recess 14' having the tapered wall sections identical to those in the previously discussed embodiments. When so positioned, the locking members 312 act in the same manner as the locking rings 100, 200 shown in the alternate preferred embodiments, to retain the spigot end of a pipe section within a bell end of another pipe section.

The embodiment shown in FIGS. 8 and 9 provides at least one advantage over previously known joints employing locking segments, for example, as seen in U.S. Pat. Nos. 3,684,320; 4,540,204; and 4,660,866. In those patents, locking segments having no elastomeric backing member have been proposed for use in retaining a weld bead or other outer protrusion on a spigot within a bell end of a pipe. In those joint designs, the locking segments are designed to loosely fit between the annular recess in the bell and the outer surface of the spigot, and the wedging action of the locking segments takes place when the spigot retracts from the bell to firmly wedge the locking members in place due to the interaction with the weld bead on the spigot.

The loose fit of the locking segments has the advantage that it is easier to initially move the segments into their desired circumferential position, however, a disadvantage of the loose fit is that the segments at the lower side of the joint will, under the influence of gravity, rest against the inner surface of the annular recess, and will provide a smaller interference surface to the weld bead. A gap will also exist between the radial inner surface of the segment and the outer peripheral surface of the spigot. If dirt or other foreign matter enters that part of the joint prior to the retraction of the spigot to firmly wedge the locking segment in place, a complete wedging of the segment may be precluded. Joint loading and/or other aspects of joint performance could thus be adversely affected. In the embodiment of FIGS. 8 and 9, the tight fit of the locking members, due to the presence of an elastomeric backing member, ensures that a positive wedging engagement between the locking segment, the annular recess of the bell, and the spigot occurs at the outset upon initial insertion of the members, even at the lower side of the joint.

Because a resiliently tight seating and fit with the first annular recess 14' is required for the plurality of locking members 312, hand tools such as hammers, pry bars, wedges, or specially designed impact tools or accessories may be used to force the locking members 312 around the joint circumference after having been inserted through slot 302. Further, although only one slot is shown in FIG. 8, the bell 12' could alternatively have two diametrically opposed slots, or three or more slots evenly spaced around the joint circumference in order to minimize the amount of required circumferential movement of the locking members. It will, however, be recognized that the use of additional slots will decrease the amount of available length around the bell for circumferential engagement of the spigot, as no locking members will be disposed at the slot areas.

The arcuate length of the locking members 312 is preferably somewhat less than the arcuate span of the opening created by slot 312, such that the locking members can be readily inserted in the slot by leading one of the ends of the locking member into the portions of the first annular recess adjacent the slot 302 at an angle. In a situation in which locking members are to be disposed substantially completely around the entire circumference of the joint, with the exception of the area containing the slot or slots 302, a retainer or spacer element (not shown) which may be of similar configuration to the backing member 316, and of an arcuate length spanning the length of the slot 302, may be provided. The retainer can be wedged in between the two locking members 312 immediately adjacent the slot, and will provide added protection against any inadvertent dislodgement of any of the locking members.

It is to be recognized that various changes and modifications may be made to any of the foregoing preferred embodiments without departing from the spirit and scope of the present invention. For example, while the elastomeric backing ring of the present invention is depicted as being of a solid cross-section, having a notch disposed in the rear face thereof, the backing ring may alternatively have a different cross-sectional shape, provided that it has a front surface to which the locking segments may be bonded, and provided that the backing ring will cooperate with the annular recess of the bell in which it is seated to urge the locking segments axially forward and radially inwardly at the completion of the joint assembly.

Thus, while the foregoing specification provides a description of the preferred embodiments of the invention, the scope of the invention is to be determined by reference to the appended claims.

What is claimed is:

1. A pipe joint comprising:
   a first piping element having a bell end, said bell end having an opening of a predetermined size, and a first annular recess in an interior surface thereof, said bell end having a radially inwardly protruding shoulder disposed axially inwardly of a front end of said first annular recess, a front axial portion of said first annular recess being bounded by a tapered wall such that said recess, in said front part, increases in diameter moving in an axially inward direction;
   a second piping element having a spigot end adapted to be inserted in and retained in said bell end of said first piping element;
   fluid seal means for providing a fluid seal between said spigot end of said second piping element and said bell end of said first piping element, said fluid sealing means being disposed axially inwardly of said first annular recess;
   locking means for retaining said spigot end of said second piping element within said bell end of said first piping element, said locking means being an element separate from said fluid seal means, said locking means comprising at least one locking member, said at least one locking member comprising an elastomeric backing member having at least one locking segment abuttingly engaging said elastomeric backing member at a front end of said elastomeric backing member, said locking means being so constructed and arranged to seat in said first annular recess in said bell end with said elastomeric backing member disposed axially inwardly of said at least one locking segment and with said elastomeric backing member seated against said shoulder of said first annular recess wherein an outer radial surface of said at least one locking segment is positively urged into contact with said tapered wall of said front axial portion of said first annular recess by said elastomeric backing member, said at least one locking segment having means for engaging said spigot end of said second piping element to retain said spigot end within said bell end.

2. A pipe joint as recited in claim 1 wherein said spigot end of said second piping element has a circumferential weld bead disposed around an exterior thereof, and wherein said spigot engaging means on said at least one locking segment comprises means for retaining said weld bead within said bell end.

3. A pipe joint as recited in claim 2 wherein said at least one locking segment is substantially in the shape of a wedge, wherein an outer radial surface thereof is tapered outwardly from a front end to a back end.

4. A pipe joint as recited in claim 3 wherein a front part of said first annular recess is tapered such that said front part increases in diameter moving in an axially inward direction, and said front part corresponds substantially in geometry to said outer radial surface of said at least one locking segment.

5. A pipe joint as recited in claim 4 wherein said weld bead retaining means comprises a rear face of said at least one locking segment disposed substantially perpendicularly to an axial direction of said first piping element, wherein said weld bead is retained by said at least one locking segment at a position axially inward of said at least one locking segment within said bell.

6. A pipe joint as recited in claim 1 wherein said spigot engaging means comprises at least one tooth disposed on an inner radial surface of said at least one locking segment and presented to said spigot end.

7. A pipe joint as recited in claim 6 wherein said at least one tooth on said at least one locking segment is made of a material which is harder than a material of said second piping element.

8. A pipe joint as recited in claim 1, wherein said fluid seal means comprises a second annular recess in said bell disposed axially inwardly of said first annular recess, and a fluid seal gasket seated in said second annular recess.

9. A pipe joint as recited in claim 1 wherein said at least one locking segment is bonded to said elastomeric backing member.

10. A pipe joint as recited in claim 1 wherein said locking means comprises a plurality of locking members seated in said first annular recess around the outer peripheral surface of said spigot end of said second piping element.

11. A pipe joint as recited in claim 1 wherein said bell end has a slot extending axially from an axial end of said first piping element to said first annular recess, said slot being of a size sufficient to permit insertion of said at least one locking member into said first annular recess after said spigot end of said second piping element has been inserted into said bell end of said first piping element.

12. A pipe joint as recited in claim 10 wherein said bell end has a slot extending axially from an axial end of said first piping element to said first annular recess, said slot being of a size sufficient to permit insertion of said plurality of locking members into said first annular recess after said spigot end of said second piping element has been inserted into said bell end of said first piping element.

13. A pipe joint as recited in claim 1 wherein said locking member comprises a locking ring wherein said elastomeric locking member is in an annular ring shape, and wherein said elastomeric backing member has a plurality of said locking segments bonded thereto around a circumference of said elastomeric backing member.

14. A pipe joint as recited in claim 13, wherein said elastomeric backing ring has an integral flap disposed at said front end, said flap extending radially inwardly from an inner radial surface of said elastomeric backing ring to an inner radial extent of said locking segments.

15. A pipe joint as recited in claim 13 wherein said elastomeric backing member is maintained in a state of circumferential compression when positioned in said first annular recess in said bell prior to the insertion of said spigot.

16. A pipe joint comprising:
    a first piping element having a bell end, said bell end having an opening of a predetermined size, and a first annular recess in an interior surface thereof, said bell end having a radially inwardly protruding shoulder disposed axially inwardly of a front end of said first annular recess, a front axial portion of said first annular recess being bounded by a tapered wall such that said recess, in said front part, increases in diameter moving in an axially inward direction;

a second piping element having a spigot end adapted to be inserted in and retained in said bell end of said first piping element;

fluid seal means for providing a fluid seal between said spigot end of said second piping element and said bell end of said first piping element, said fluid sealing means being disposed axially inwardly of said first annular recess;

locking ring means separate from said fluid seal means for retaining said spigot end of said second piping element within said bell end of said first piping element, said locking ring means comprising at least one locking member, said at least one locking member comprising an elastomeric backing member having a plurality of segments abuttingly engaging said elastomeric backing member at a front end of said elastomeric backing member, said locking ring means being so constructed and arranged to seat in said first annular recess in said bell end such that said bell end exerts a residual circumferential compressive force on said elastomeric backing member, and wherein said elastomeric backing member is disposed axially inwardly of said plurality of locking segments, said elastomeric backing member further being seated against said shoulder of said first annular recess wherein an outer radial surface of each of said plurality of locking segments is resiliently urged into contact with said tapered wall of said front axial portion of said first annular recess, each of said plurality of said locking segments having means for engaging said spigot end of said second piping element to retain said spigot end within said bell end.

17. A pipe joint as recited in claim 16 wherein said plurality of locking segments are bonded to said elastomeric backing member.

18. A pipe joint as recited in claim 16 wherein said spigot end of said second piping element has a circumferential weld bead disposed around an exterior thereof, and wherein said spigot engaging means on each of said plurality of locking segments comprises means for retaining said weld bead within said bell end.

19. A pipe joint as recited in claim 18 wherein each of said plurality of locking segments is substantially in the shape of a wedge, wherein an outer radial surface thereof is tapered outwardly from a front end to a back end.

20. A pipe joint as recited in claim 19 wherein a front part of said first annular recess is tapered such that said front part increases in diameter moving in an axially inward direction, and said front part corresponds substantially in geometry to said outer radial surface of said plurality of locking segments.

21. A pipe joint as recited in claim 20 wherein said weld bead retaining means comprises a rear face on each of said locking segments disposed substantially perpendicularly to an axial direction of said first piping element, wherein said weld bead is retained by said locking segments by said rear faces at a position axially inwardly of said plurality of locking segments within said bell.

22. A pipe joint as recited in claim 16 wherein said spigot engaging means comprises at least one tooth disposed on an inner radial surface on each of said locking segments and presented to said spigot end.

23. A pipe joint as recited in claim 22 wherein said at least one tooth on each of said plurality of locking segments is made of a material which is harder than said second piping element material.

24. A pipe joint as recited in claim 23 wherein said pluarlity of locking segments are made of austempered ductile iron.

25. A pipe joint as recited in claim 16 wherein said fluid seal means comprises a second annular recess in said bell disposed axially inwardly of said first annular recess, and a fluid seal gasket seated in said second annular recess.

26. A pipe joint as recited in claim 16 wherein said plurality of locking segments collectively form a ring extending around an entire circumference of a elastomeric backing ring.

27. A pipe joint as recited in claim 16 wherein said elastomeric backing member has at least one split at a predetermined circumferential location.

28. A pipe joint as recited in claim 27 wherein said split elastomeric backing member is adjustable in size to be used with piping elements of varying diameter.

29. A pipe joint as recited in claim 28 wherein the elastomeric backing member is sized to be maintained in a state of circumferential compression when seated in said first annular recess whereby the weight of said locking segments is radially supported by said circumferential compression in said elastomeric backing member.

30. A pipe joint as recited in claim 17 wherein said locking ring means comprises a plurality of elastomeric backing members and associated locking segments.

31. A pipe joint as recited in claim 16 wherein said shoulder in said bell end is disposed at an innermost extent of said first annular recess.

32. A pipe joint as recited in claim 16 wherein said elastomeric backing member has an annular notch extending around a back face thereof.

33. A locking member for axially restraining a spigot end of a piping element in fluid sealed engagement with a bell end of another piping element, said locking member being an element separate from a fluid seal means operating between said spigot end and said bell end, the locking member comprising:

an arcuate elastomeric backing member adapted to seat in an annular recess in said bell end and against a radially inwardly protruding shoulder in said bell end; and at least one arcuate locking segment bonded to and extending axially outwardly of said elastomeric backing member when said elastomeric backing member is seated in said annular recess, said locking segment having means for engaging said spigot end to retain said spigot and within said bell end;

wherein said elastomeric backing member of said locking member is so constructed and arranged to urge an outer radial surface of said at least one locking segment into contact with a tapered wall at a front axial portion of said annular recess when said elastomeric backing member is seated against said shoulder in said bell end.

34. A locking member as recited in claim 33 wherein said elastomeric backing member forms an annular ring, and wherein said ring has a plurality of said locking segments bonded thereto.

35. A locking member as recited in claim 33 wherein said spigot engaging means of said at least one locking segment comprises a tooth disposed on an inner radial surface thereof.

36. A locking member as recited in claim 33 wherein said spigot engaging means of said at least one locking segment comprises means for retaining a weld bead disposed around an outer peripheral surface of said spigot end within said bell end.

* * * * *

UNITED STATES PATENT AND TRADEMARK OFFICE
CERTIFICATE OF CORRECTION

PATENT NO. : 5,197,768

DATED : March 30, 1993

INVENTOR(S) : Randall CONNER

It is certified that error appears in the above-identified patent and that said Letters Patent is hereby corrected as shown below:

Col. 16, line 26 (claim 30, line 1) "claim 17" should be -- claim 27 --.

Signed and Sealed this

Twelfth Day of April, 1994

Attest:

BRUCE LEHMAN

Attesting Officer

Commissioner of Patents and Trademarks

REEXAMINATION CERTIFICATE (2528th)

United States Patent [19]
Conner

[11] B1 5,197,768
[45] Certificate Issued Apr. 4, 1995

[54] RESTRAINED JOINT HAVING ELASTOMER-BACKED LOCKING SEGMENTS

[75] Inventor: Randall C. Conner, Warrior, Ala.

[73] Assignee: American Cast Iron Pipe Company, Birmingham, Ala.

Reexamination Request:
No. 90/003,296, Jan. 3, 1994

Reexamination Certificate for:
Patent No.: 5,197,768
Issued: Mar. 30, 1993
Appl. No.: 774,351
Filed: Oct. 10, 1991

Certificate of Correction issued Apr. 12, 1994.

[51] Int. Cl.$^6$ ............................................. F16L 21/02
[52] U.S. Cl. ................................... 285/105; 285/321; 285/231; 285/232; 285/374
[58] Field of Search ............... 285/374, 321, 104, 105, 285/231, 232; 277/DIG. 2

[56] References Cited

U.S. PATENT DOCUMENTS

| | | | |
|---|---|---|---|
| 3,724,880 | 4/1973 | Seiler | 285/105 |
| 4,648,633 | 3/1987 | Bergmann | 285/337 |
| 4,805,932 | 2/1989 | Imhof et al. | 285/4 |
| 4,867,488 | 9/1989 | Jones | 285/374 |
| 4,871,197 | 10/1989 | Codding, III et al. | 285/231 |
| 5,067,751 | 11/1991 | Walworth et al. | 285/105 |
| 5,269,569 | 12/1993 | Weber et al. | 285/232 |
| 5,297,824 | 3/1994 | Imhof et al. | 285/374 |

*Primary Examiner*—Eric K. Nicholson

[57] ABSTRACT

A pipe joint and a locking member for use with the pipe joint are provided for a bell and spigot type joint, the locking member being a separate element disposed axially outwardly of a fluid seal gasket within the bell end of a first of the pipe elements, the locking member being made up of an elastomeric backing member and at least one locking segment, the elastomeric backing member being adapted to seat in a first annular recess in the bell end, and against a radially inwardly protruding shoulder, this seating position urging the outer surface of the locking segment into contact with the wall of the first annular recess, to effect a constant, positive wedging action against a spigot end of a second pipe element inserted into the bell end of the first pipe element. The locking member thus securely engages and retains the spigot end within the bell end against axial forces tending to separate the pipe elements, and the locking member serves as a dirt seal improving the prevention of dirt and other materials from entering the bell end of the joint which could adversely affect the integrity of the fluid seal or interfere with the ability to efficiently induce any desired joint deflection.

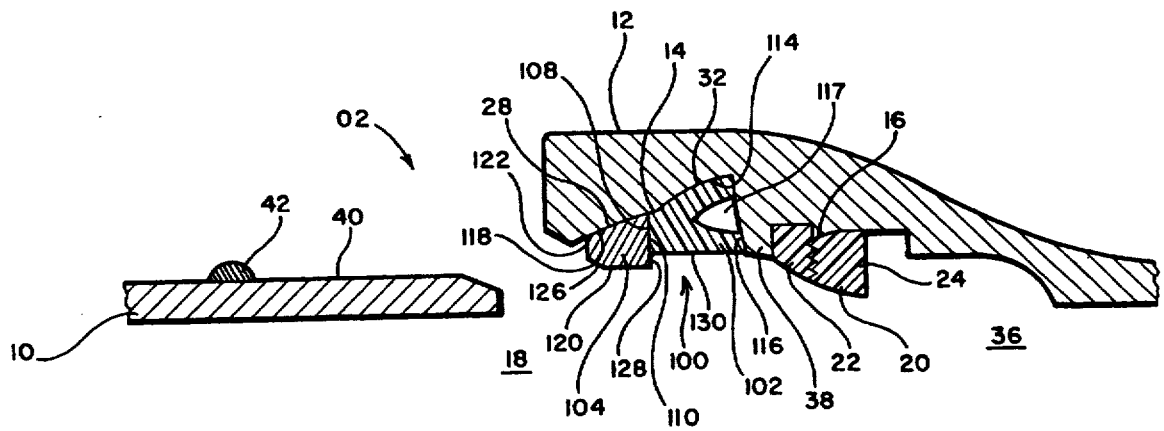

B1 5,197,768

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–5, 9, 11–15, 17–21, 27–30 and 32–36 are confirmed.

Claims 1, 6, 7, 8, 10, 16, 22–26 and 31 are cancelled.

New claims 37–61 are added and determined to be patentable.

*37. A pipe joint comprising:*
   *a first piping element having a one piece bell end, said bell end having an opening of a predetermined size, and a first annular recess in an interior surface thereof, said bell end having a radially inwardly protruding shoulder disposed axially inwardly of a front end of said first annular recess, a front axial portion of said first annular recess being bounded by a tapered wall such that said recess, in said front part, increases in diameter moving in an axially inward direction;*
   *a second piping element having a spigot end adapted to be inserted in and retained in said bell end of said first piping element;*
   *fluid seal means for providing a fluid seal between said spigot end of said second piping element and said bell end of said first piping element, said fluid sealing means being disposed axially inwardly of said first annular recess;*
   *locking means for retaining said spigot end of said second piping element within said bell end of said first piping element, said locking means being an element separate from said fluid seal means, said locking means comprising at least one locking member, said at least one locking member comprising an elastomeric backing member having at least one locking segment abuttingly engaging said elastomeric backing member at a front end of said elastomeric backing member, said locking means being so constructed and arranged to seat in said first annular recess in said bell end with said elastomeric backing member disposed axially inwardly of said at least one locking segment and with said elastomeric backing member seated against said shoulder of said first annular recess wherein an outer radial surface of said at least one locking segment ispositively urged into contact with said tapered wall of said front axial portion of said first annular recess by said elastomeric backing member, said at least one locking segment having means for engaging said spigot end of said second piping element to retain said spigot end within said bell end.*

*38. A pipe joint as recited in claim 37 wherein said at least one locking segment is attached to said elastomeric backing member.*

*39. A pipe joint as recited in claim 37 wherein said spigot engaging means comprises at least one tooth disposed on an inner radial surface of said at least one locking segment and presented to said spigot end.*

*40. A pipe joint as recited in claim 39 wherein said at least one tooth on said at least one locking segment is made of a material which is harder than a material of said second piping elements.*

*41. A pipe joint as recited in claim 37 wherein said fluid seal means comprises a second annular recess in said bell disposed axially inwardly of said first annular recess, and a fluid seal gasket seated in said second annular recess.*

*42. A pipe joint as recited in claim 37 wherein said locking means comprises a plurality of locking members seated in said first annular recess around the outer peripheral surface of said spigot end of said second piping element.*

*43. A self-locking, axially restrained pipe joint comprising:*
   *a first piping element having a bell end, said bell end having an opening of a predetermined size, and a first annular recess in an interior surface thereof, said bell end having a radially inwardly protruding shoulder disposed axially inwardly of a front end of said first annular recess, a front axial portion of said first annular recess being bounded by a tapered wall such that said recess, in said front part, increases in diameter moving in an axially inward direction;*
   *a second piping element having a spigot end adapted to be inserted in and retained in said bell end of said first piping element;*
   *fluid seal means for providing a fluid seal between said spigot end of said second piping element and said bell end of said first piping element, said fluid sealing means being disposed axially inwardly of said first annular recess;*
   *locking means for retaining said spigot end of said second piping element within said bell end of said first piping element, said locking means being an element separate from said fluid seal means, said locking means comprising at least one locking member, said at least one locking member comprising an elastomeric backing member having at least one locking segment abuttingly engaging said elastomeric backing member at a front end of said elastomeric backing member, said locking means being so constructed and arranged to seat in said first annular recess in said bell end, prior to insertion of said spigot end of said second piping element into said bell end, wherein said elastomeric backing member is disposed axially inwardly of said at least one locking segment and wherein said elastomeric backing member is seated against said shoulder of said first annular recess, wherein an outer radial surface of said at least one locking segment is positively urged into contact with said tapered wall of said front axial portion of said first annular recess by said elastomeric backing member, and wherein said at least one locking segment protrudes radially inwardly into said opening in said bell end to an extent sufficient to require that the spigot end, once inserted, must contact the at least one locking segment and move said locking segment axially inwardly and radially outwardly in the bell end in order for the spigot end to be fully inserted into said bell end, thereby effecting a self-locking axial restraint, said at least one locking segment having means for engaging said spigot end of said second piping element to retain said spigot end within said bell end.*

*44. A self-locking, axially restrained pipe joint comprising:* a first piping element having a bell end, said bell end having an opening of a predetermined size, and a first annular recess in an interior surface thereof, said bell end having a radially inwardly protruding shoulder disposed axially inwardly of a front end of said first annular recess, a front axial portion of said first annular recess being bounded by a tapered wall such that said recess, in said front part, increases in diameter moving in an axially inward direction;

a second piping element having a spigot end adapted to be inserted in and retained in said bell end of said first piping element;

fluid seal means for providing a fluid seal between said spigot end of said second piping element and said bell end of said first piping element, said fluid sealing means being disposed axially inwardly of said first annular recess;

locking means for retaining said spigot end of said second piping element within said bell end of said first piping element, said locking means being an element separate from said fluid seal means, said locking means comprising at least one locking member, said at least one locking member comprising an elastomeric backing member having at least one locking segment abuttingly engaging said elastomeric backing member at a front end of said elastomeric backing member, said locking means being so constructed and arranged to seat in said first annular recess in said bell end with said elastomeric backing member disposed axially inwardly of said at least one locking segment and with said elastomeric backing member seated against said shoulder of said first annular recess wherein an outer radial surface of said at least one locking segment is positively urged into contact with said tapered wall of said front axial portion of said first annular recess by said elastomeric backing member prior to insertion of said spigot end of said piping element into said bell end to produce a self-locking axial restraint, said at least one locking segment having means for engaging said spigot end of said second piping element to retain said spigot end within said bell end, and wherein said at least one locking segment is attached to said elastomeric backing member.

45. A pipe joint as recited in claim 43 wherein said spigot engaging means comprises at least one tooth disposed on an inner radial surface of said at least one locking segment and presented to said spigot end.

46. A pipe joint as recited in claim 45 wherein said at least one tooth on said at least one locking segment is made of a material which is harder than a material of said second piping element.

47. A pipe joint as recited in claim 43 wherein said fluid seal means comprises a second annular recess in said bell disposed axially inwardly of said first annular recess, and a fluid seal gasket seated in said second annular recess.

48. A pipe joint as recited in claim 43 wherein said locking means comprises a plurality of locking members seated in said first annular recess around the outer peripheral surface of said spigot end of said second piping element.

49. A pipe joint comprising:

a first piping element having a bell end, said bell end having an opening of a predetermined size, and a first annular recess in an interior surface thereof, said bell end having a radially inwardly protruding shoulder disposed axially inwardly of a front end of said first annular recess, a front axial portion of said first annular recess being bounded by a tapered wall such that said recess, in said front part, increases in diameter moving in an axially inward direction;

a second piping element having a spigot end adapted to be inserted in and retained in said bell end of said first piping element;

fluid seal means for providing a fluid seal between said spigot end of said second piping element and said bell end of said first piping element, said fluid sealing means being disposed axially inwardly of said first annular recess;

locking means for retaining said spigot end of said second piping element within said bell end of said first piping element, said locking means being an element separate from said fluid seal means, said locking means comprising at least one locking member, said at least one locking member comprising an elastomeric backing member having at least one locking segment abuttingly engaging said elastomeric backing member at a front end of said elastomeric backing member, said locking means being so constructed and arranged to seat in said first annular recess in said bell end with said elastomeric backing member disposed axially inwardly of said at least one locking segment and with said elastomeric backing member seated against said shoulder of said first annular recess wherein an outer radial surface of said at least one locking segment is positively urged into contact with said tapered wall of said front axial portion of said first annular recess by said elastomeric backing member, said at least one locking segment having means for engaging said spigot end of said second piping element to retain said spigot end within said bell end, and wherein said at least one locking segment is attached to said elastomeric backing member.

50. A pipe joint comprising:

a first piping element having a bell end, said bell end having an opening of a predetermined size, and a first annular recess in an interior surface thereof, said bell end having a radially inwardly protruding shoulder disposed axially inwardly of a front end of said first annular recess, a front axial portion of said first annular recess being bounded by a tapered wall such that said recess, in said front part, increases in diameter moving in an axially inward direction;

a second piping element having a spigot end adapted to be inserted in and retained in said bell end of said first piping element;

fluid seal means for providing a fluid seal between said spigot end of said second piping element and said bell end of said first piping element, said fluid sealing means being disposed axially inwardly of said first annular recess;

locking ring means separate from said fluid seal means for retaining said spigot end of said second piping element within said bell end of said first piping element, said locking ring means comprising at least one locking member, said at least one locking member comprising an elastomeric backing member having a plurality of segments abuttingly engaging said elastomeric backing member at a front end of said elastomeric backing member, said locking ring means being so constructed and arranged to seat in said first annular recess in said bell end such that said bell end exerts a residual radial circumferential compressive force on said elastomeric backing member, and wherein said elastomeric backing member is disposed axially inwardly of said plurality of locking segments, said elastomeric backing member further being seated against said shoulder of said first annular recess wherein an outer radial surface of each of said plurality of locking segments is resiliently urged into contact with said tapered wall of said front axial portion of said first annular recess, each of said plurality of said locking segments having means for engaging said spigot end of said second piping element to retain said spigot end within said bell end.

51. A pipe joint as recited in claim 50 wherein said spigot engaging means comprises at least one tooth disposed on an inner radial surface on each of said locking segments and presented to said spigot end.

52. A pipe joint as recited in claim 51 wherein said at least one tooth on each of said plurality of locking segments is made of a material which is harder than said second piping element material.

53. A pipe joint as recited in claim 52 wherein said plurality of locking segments are made of austempered ductile iron.

54. A pipe joint as recited in claim 50 wherein said fluid seal means comprises a second annular recess in said bell disposed axially inwardly of said first annular recess, and a fluid seal gasket seated in said second annular recess.

55. A pipe joint as recited in claim 50 wherein said plurality of locking segments collectively form a ring extending around an entire circumference of a elastomeric backing ring.

56. A pipe joint as recited in claim 50 wherein said shoulder in said bell end is disposed at an innermost extent of said first annular recess.

57. A pipe joint as recited in claim 50 wherein said plurality of locking segments are attached to said elastomeric backing member.

58. A pipe joint as recited in claim 49 wherein said spigot engaging means comprises at least one tooth disposed on an inner radial surface of said at least one locking segment and presented to said spigot end.

59. A pipe joint as recited in claim 58 wherein said at least one tooth on said at least one locking segment is made of a material which is harder than a material of said second piping element.

60. A pipe joint as recited in claim 49, wherein said fluid seal means comprises a second annular recess in said bell disposed axially inwardly of said first annular recess, and a fluid seal gasket seated in said second annular recess.

61. A pipe joint as recited in claim 49 wherein said locking means comprises a plurality of locking members seated in said first annular recess around the outer peripheral surface of said spigot end of said second piping element.

* * * * *